US006813959B2

(12) United States Patent
Kim et al.

(10) Patent No.: US 6,813,959 B2
(45) Date of Patent: Nov. 9, 2004

(54) APPARATUS AND METHOD FOR MEASURING RESIDUAL STRESS AND PHOTOELASTIC EFFECT OF OPTICAL FIBER

(75) Inventors: Dug-Young Kim, Kwangjukwangyok-shi (KR); Yong-Woo Park, Seoul (KR); Un-Chul Paek, Kwangjukwangyok-shi (KR); Mun-Hyun Do, Kumi-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/434,490

(22) Filed: May 8, 2003

(65) Prior Publication Data
US 2003/0206678 A1 Nov. 6, 2003

Related U.S. Application Data

(62) Division of application No. 09/803,873, filed on Mar. 13, 2001, now Pat. No. 6,647,162.

(30) Foreign Application Priority Data

Mar. 13, 2000  (KR) ........................................ 2000-12395

(51) Int. Cl.[7] .............................. G01L 1/24; G01N 21/00
(52) U.S. Cl. ........................................... 73/800; 385/13
(58) Field of Search ..................... 73/800, 760; 385/13, 385/15

(56) References Cited

U.S. PATENT DOCUMENTS

| 3,440,430 | A | 4/1969 | Tansley ...................... 250/219 |
| 4,171,908 | A | 10/1979 | Robert et al. ................. 356/33 |
| 4,648,274 | A | 3/1987 | Trainer ...................... 73/517 R |
| 5,400,131 | A | 3/1995 | Stockley et al. ............... 356/33 |
| 5,410,917 | A | 5/1995 | Giversen et al. .............. 73/800 |
| 6,175,416 | B1 | 1/2001 | Maris et al. ................. 356/381 |
| 6,647,162 | B2 | * 11/2003 | Kim et al. ..................... 385/13 |
| 6,678,433 | B2 | * 1/2004 | Kim et al. ..................... 385/15 |

FOREIGN PATENT DOCUMENTS

EP   0190922   8/1986   .......... G01M/11/00

OTHER PUBLICATIONS

Rose et al., Fast photoelastick Stress Determination: Application To Monomode Fibres and Splices, Mar. 1993, Measurement Science & Technology, 4 pages.

Chu; et al.; "Measurement of Stresses in Optical Fiber and Preform", Applied Optics, Dec. 1, 1982; vol. 21, No. 23, pp. 4241–4245.

(List continued on next page.)

Primary Examiner—Edward Lefkowitz
Assistant Examiner—Takisha Miller
(74) Attorney, Agent, or Firm—Cha & Reiter, L.L.C.

(57) ABSTRACT

Disclosed is an apparatus for measuring a residual stress and a photoelastic effect of an optical fiber, which includes: a light source; a rotary type optical diffuser distanced from the light source in a predetermined distance for suppressing the spatial coherence of a light radiated in the light source; an optical condenser for condensing the radiated light passed through the optical diffuser into a spot where the optical fiber is located; a polarizer for polarizing the light passed through the optical condenser into a 45° linear polarized light from an axis of the optical fiber; a polarization analyzer, installed at 90° angle with respect to the polariscope and attached closely with the optical fiber, to prevent the penetration by the background image of the optical fiber; an optical fiber strain unit including a strain sensor for straining the optical fiber on the polarization analyzer toward a longitudinal direction and measuring the strain on the optical fiber; an object lens for magnifying the image of the light penetrated through the optical fiber; and a charge coupled device(CCD) array for measuring the penetration variation of the optical fiber caused from the strain caused by the optical fiber strain unit over the optical fiber.

2 Claims, 3 Drawing Sheets

OTHER PUBLICATIONS

Rose; et al.; "Fast Photoelastic Stress Determination: Application to Monomode Fibres and Splices", Meas. Sci. Technol. 4, 1993, pp. 431–434.

Raine; et al.; "Measurement of Axial Stress at High Spatial Resolution in Ultraviolet–Exposed Fibers", Applied Optics, Mar. 1, 1999; vol. 38, No. 7, pp. 1086–1095.

* cited by examiner

APPARATUS AND METHOD FOR MEASURING RESIDUAL STRESS AND PHOTOELASTIC EFFECT OF OPTICAL FIBER

This application is a Divisional Application of U.S. Ser. No. 09/803,873, filed Mar. 13, 2001, now U.S. Pat No. 6,647,162.

CLAIM OF PRIORITY

This application claims priority to an application entitled "APPARATUS AND METHOD FOR MEASURING RESIDUAL STRESS", filed with the Korean Industrial Property Office on Mar. 13, 2000 and there duly assigned Serial No. 2000-12395.

BACKGROUND OF THE INVENTION

1. Field of the Invention

The present invention generally relates to an optical fiber, and in particular, to an apparatus and method for measuring the residual stress and photoelastic effect of an optical fiber.

2. Description of the Related Art

Optical elements may be subject to various type of strain caused by factors, such as mechanical tension, compression or sheer due to internal stress, and/or improper cooling or annealing during manufacture of the optical element. In particular, the stress generated during the manufacture of an optical fiber, known as residual stress, causes a direct effect in varying the index of refraction in the fiber element. Namely, the residual stress generated in the drawing process of the optical fiber at high temperature causes the refractive index variation by a photoelastic effect and increases the optical losses caused by the light diffusion in the optical fiber.

One method is disclosed in a thesis paper written by P. L. Chu and T. Whitebread, "Measurement of stresses in optical fiber and preform, Appl. Opt. 1982, 21, pp. 4241–4245." In this paper, a concrete method and a theory for measuring the residual stress of an optical fiber using a photoelastic effect are suggested. Another thesis paper by J. R. Kropp, "Fast photoelastic stress determination application to monomode fiber and splices, Meas. Sci. Technol. 4,431–434, 1993" discloses a similar optical measuring apparatus using the photoelastic effect to observe the residual stress of a monomode fiber and the stress generated in the fusion splice of the fiber. Another thesis paper is written by K. W. Raine, entitled, "Measurement of Axial Stress at High Spatial Resolution in Ultraviolet-Exposed Fibers" and discloses an apparatus for measuring the residual stress of an optical fiber by applying a charge coupled device(CCD) array and a half-shading process.

Accordingly, it is important to measure the residual stress in an optical fiber in order to manufacture high-quality fibers. To this end, a detecting apparatus is used to measure the residual stress associated with the optical fiber. As such, the detecting device is typically provided to exam the spectrum penetrability of the fiber element by observing the light passed through the fiber. In addition, the device detects the distribution of the periodical residual stress along the longitudinal direction of an optical fiber and the refractive index variation caused by the residual stress. Hence, the refractive index variation depends on the direction of a stress remained in the optical fiber and the polarized direction of the light passed through the optical fiber.

When two light beams of orthogonally polarized components penetrate the optical fiber (or optical preform) at a right angle to the axis of the optical fiber (or optical preform), a photoelastic effect is occurred by the residual stress in the fiber which in turn causes a phase difference in the penetrated light according to the polarized direction of the light. Accordingly, the magnitude of the residual stress associated with an optical element can be detected by measuring the phase difference with a polarizer. The following methods uses this phenomena to measure the residual stress along the optical fiber (or optical preform).

One method is disclosed in a thesis paper written by P. L. Chu and T. Whitebread, "Measurement of stresses in optical fiber and preform, Appl. Opt. 1982, 21, pp. 4241–4245." In this paper, a concrete method and a theory for measuring the residual stress of an optical fiber using a photoelastic effect are suggested. Another thesis paper by J. R. Kropp, "Fast photoelastic stress determination application to monomode fiber and splices, Meas. Sci. Technol. 4, 431–434, 1993" discloses a similar optical measuring apparatus using the photoelastic effect to observe the residual stress of a monomode fiber and the stress generated in the fusion splice of the fiber. Another thesis paper is written by K. W. Raine, entitled, "Measurement of Axial Stress at High Spatial Rsoution in Ultraviolet-Exposed Fibers" and discloses an apparatus for measuring the residual stress of an optical fiber by applying a charge coupled device(CCD) array and a half-shading process.

Another common method for measuring the residual stress of an optical fiber involves examining the residual stress of an optical preform having a larger cross section area (4 cm in diameter) than an optical fiber. However, there is a disadvantage in this method in that a mechanical residual stress generated in the manufacturing process of an optical fiber can not be measured as the optical preform possesses only the thermal residual stress.

Thus, measuring the optical fiber directly instead of the optical preform is more preferred. However, the high resolution and micro measurement techniques are required in this preferred method as the size of the optical fiber tend to be relatively small (i.e., cladding diameter=120 $\mu$m, core diameter=8 $\mu$m). Moreover, when measuring the residual stress of an optical preform, the phase difference of polarized light is expected to be equal to or less than 180°. However, the optical path length of the optical fiber is only about $\frac{1}{100}^{th}$ of the optical preform; thus, the phase difference of an optical fiber is estimated but tends to be equal or less than 2°. Hence, it requires a special measuring device with the resolution of at least 0.1°. As the diameter of the optical fiber is around 125 $\mu$m, the prior system requires an additional magnifying device to project the fine images. In addition, this method has a drawback in that the lens device is not easily and closely attachable to the optical fiber due to the required rotation unit of the polarization analyzer and the one-quarter waveplate.

Furthermore, there is more problem associated with the above prior art system in that both the optical fiber and the background of the optical fiber are modulated due to the periodical variation of the penetrated light when the rotating analyzer is being rotated. As a consequence, this type of modulation makes it difficulty to find the exact image of an optical fiber, thereby causing an image distortion due to the diffusion of light around an optical detector. Accordingly, there is a need for an improved detecting mechanism that can overcome the problems associated with the prior art systems.

SUMMARY OF THE INVENTION

It is, therefore, an object of the present invention to provide an apparatus and method for measuring the residual stress and photoelastic effect of an optical fiber in which the distribution of three dimensional residual stress along the longitudinal direction can be measured precisely, thereby improving the manufacturing process of an optical fiber.

Another object of the present invention is to provide an apparatus and method for measuring the residual stress and photoelastic effect of an optical fiber by measuring the light intensity variation penetrated through the optical fiber while gradually increasing a strain over the optical fiber using a fixed polarizer.

To achieve the above objects, there is provided an apparatus for measuring the residual stress and photoelastic effect of an optical fiber and includes: a light source; a rotary type optical diffuser distanced from the light source in a predetermined distance for suppressing the spatial coherence of light radiated in the light source; an optical condenser for condensing the radiated light passed through the optical diffuser into a spot where the optical fiber is located; a polarizer for polarizing the light passing through the optical condenser to a linearly polarized light at an angle of 45 degrees from the axis of the optical fiber; a polarization analyzer installed at an angle of 90 degrees with respect to the polarizer and attached closely to the optical fiber to prevent the polarization error when light pass through the large area of the polarization analyzer; an optical fiber strain unit with a strain sensor for straining the optical fiber on the polarization analyzer along the longitudinal direction, and for measuring the applied strain on the fiber; an object lens for magnifying the image of light penetrated through the optical fiber; and, a charge coupled device(CCD) array for measuring the penetration variation of an optical fiber under the control of an optical fiber strain unit.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE PREFERRED EMBODIMENT

A preferred embodiment of the present invention will be described herein below with reference to the accompanying drawings. For the purpose of clarity and simplicity, well-known functions or constructions are not described in detail as they would obscure the invention in unnecessary detail.

In the preferred embodiment, unlike the prior art systems, the polarizer 108 in the present invention is not rotated, but fixed in a specific location to measure the intensity variation of the penetrated light while applying a strain gradually over an optical fiber. When a strain over the optical fiber is increased gradually, a phase value of the penetrated light is linearly increased using a photoelastic effect. In this manner, the light intensity that measured by passing through the polariscope periodically will exhibit a shape of a sine function (see FIG. 3). Hence, the phase variation caused by the residual stress of the optical fiber can be obtained by measuring the phase of the sine function (explained later). Accordingly, the technical problems associated with the prior art systems can be considerably resolved using the inventive apparatus and process. As a consequence, the inventive apparatus improves the resolution of a residual stress, maximizes an image magnification, and eliminates the polarization error when light pass through the analyzer. Furthermore, the photoelastic effect of the optical fiber can be measured efficiently and accurately.

In general, the residual stress of the optical fiber generally tend to be around several Mpa. In the prior art system, the magnitude of the residual stress is measured by applying strain over the optical fiber with 125 $\mu$m in diameter. However the phase variation derived from the photoelastic effect of the optical fiber by straining the optical fiber with 0.5 $\mu$m in diameter requires the polarization analyzer to move at 0.01°. Accordingly, it is very difficult to provide a polarization analyzer in the prior art system moving at such a low angle. Thus, the present invention has a great advantage compared to the prior art system as the straining of the optical fiber at bout 0.5 $\mu$m is achieved using a step motor; thus, it is much easier to implement than moving of the polarization analyzer at 0.01°.

Now, the provision of an apparatus to detect the residual stress and photoelastic effect of an optical fiber according to the present invention will be explained in detailed description.

Figure 1:
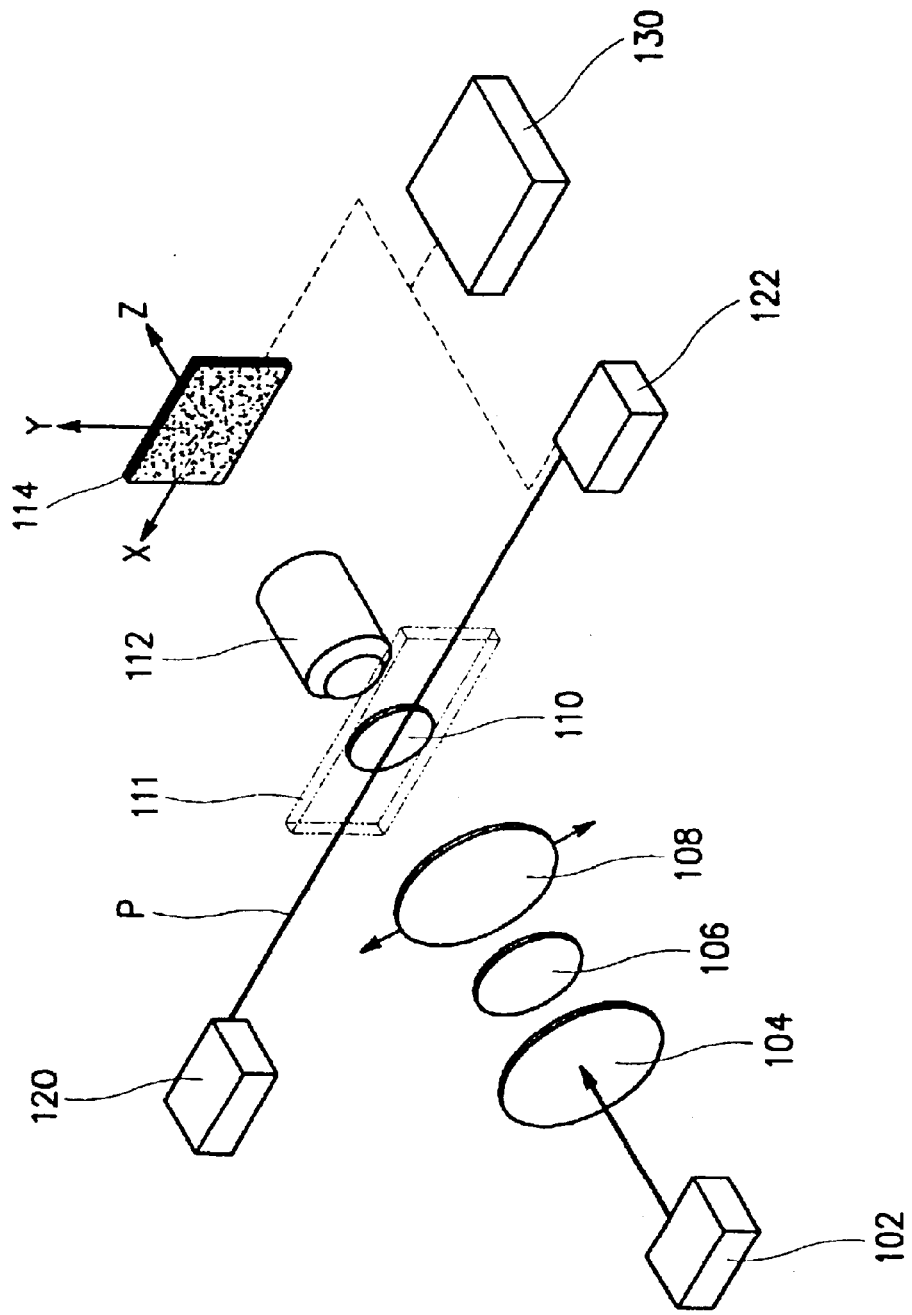
FIG. 1 is a perspective view for a disassembled apparatus for measuring the residual stress and photoelastic effect of an optical fiber according to an embodiment of the present invention.

FIG. 1 is a perspective view of a disassembled apparatus for measuring the residual stress and the photoelastic effect of an optical fiber according to the embodiment of the present invention. As shown in FIG. 1, the apparatus measures a periodical variation of the light intensity while applying a strain gradually to the optical fiber. To achieve this, the apparatus includes a light source 102, such as a helium neon laser or argon-ion laser; an optical diffuser 104; an optical condenser 106; a polarizer 108; a motorized linear stage 120; a strain sensor 122; a microscope slide glass cover 111; a polarization analyzer 110; an object lens 112; and, a charge coupled device(CCD) array 114.

In the embodiment of the present invention, the light radiated from the light source 102 is completely diffused and radiated through the optical diffuser 104. As mention before, a helium neon laser or argon-ion laser may be used as the light source 102. Compared to other available lasers, the helium neon laser or the argon-ion laser is regarded as providing short wavelengths, thus being an ideal light source in indicating each unique phase variation when the light is penetrated through the optical fiber, P, especially when the spectrum to be detected is very narrow.

The optical diffuser 104 is able to eliminate various kinds of diffraction fringe generated from a spatial coherence of the light source 102 on the image. Here, the optical diffuser 104 is configured to rotate at a speed higher than 1000 rpm. The rotation of the optical diffuser 104 at high speed helps to obtain a uniform and sharp image. The light radiated through the optical diffuser 104 is condensed, using an optical condensor 106, into a spot where the optical fiber P is installed. The condensed light is polarized into a linear polarization leaning at 45° to the axis of the optical fiber P by the polariscope 108, which is located next to the optical condenser 106. In this manner, the incident linearly polarized light with a combination of two polarizing light components, P and S, from the longitudinal direction of the optical fiber P are entered on the optical fiber P, simultaneously. To reduce the polarization errors from an imbalance of the polariscope 108, it is preferably to obtain a smallest spot size where the light penetrates the optical fiber.

As shown in FIG. 1, one end of the optical fiber P is connected to the motorized linear stage 120, and the other end is connected to the strain sensor 122. A piezo-electric transducer is used as a strain sensor 122. In the preferred embodiment, the strain is measured by the piezo-electric transducer 122, which is connected to the other end of the optical fiber P, while the motorized linear stage 120 is drawing the optical fiber P gradually at a predetermined rate.

Figure 2:
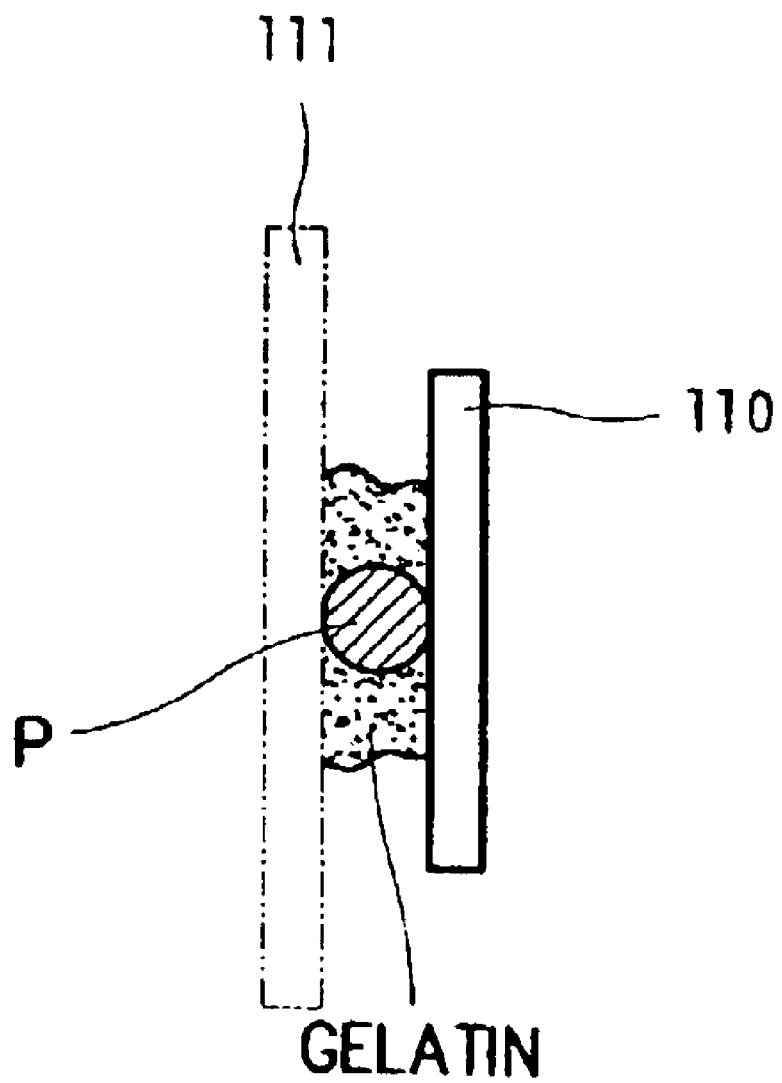
FIG. 2 is a cross-sectional view illustrating the state of the optical fiber installed between a glass cover and a polarization analyzer for measuring the strain of an optical fiber according to an embodiment of the present invention; and, FIG. 3 illustrates the light intensity graph when there is no residual stress in the optical fiber and a strain is applied to the optical fiber; and, FIG. 4 represents light intensity measured when there is a residual stress in the optical fiber and a strain is applied to the optical fiber.

As shown in FIG. 2, the optical fiber P is disposed between the microscope slide glass cover 111 and the polarization analyzer 110, and the fiber is surrounded by materials exhibiting similar refractive index of the fiber glass, such as gelatin or glycerin. This type of installation of the optical fiber P can reduce the polarization errors when light pass through the large area of the polarization analyzer 110 as the polarization analyzer 110 can be attached closely to the optical fiber P, and also enable a greater magnified image as the optical fiber P is located closer proximate to the object lens 112.

The polarization analyzer 110 is installed at a right angle with the polariscope 108. Therefore, light that cannot penetrate the, optical fiber P is not able to penetrate the optical fiber P regardless the amount of stretch load applied to the optical fiber P. In this manner, the structure provides conveniences in suppressing an image distortion by the diffusion of a circumferential light.

The distance of the optical fiber P and the object lens 112 is adjusted minutely to focus the image of the optical fiber P on the CCD array 114. At this time, the distance is adjusted to make a magnification at about 100 times. The essential principle of the present invention is that CCD array 114 measures the penetrated light variation by increasing strains on the optical fiber P. The penetrated light is come to be a different value respectively in accordance with the radial coordinate of the optical fiber P and the rate of a strain. Therefore, the residual stress and photoelastic effect are obtained by measuring and calculating the light penetration modulation according to the stretch of each radial coordinate.

Figure 3:
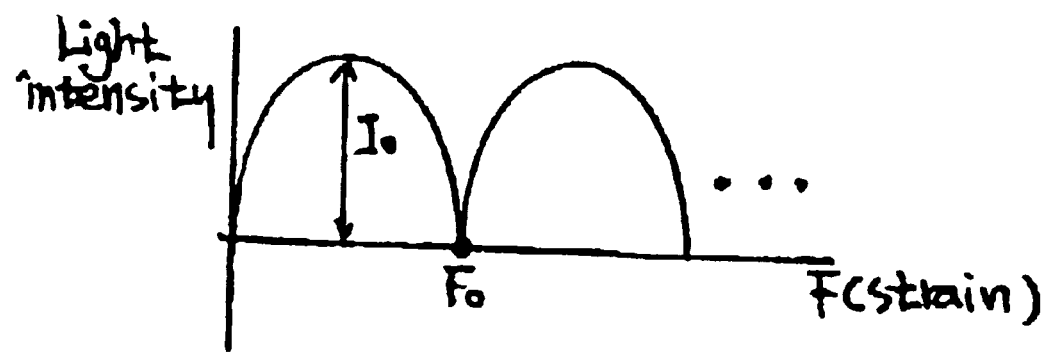
Figure 4:
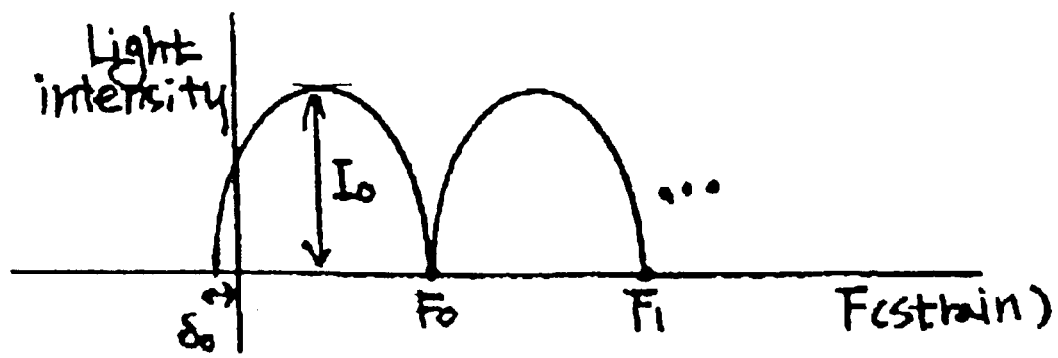

Referring to FIG. 3 and FIG. 4, the second curve shape of light intensity modulation or intensity fluctuation is generated due to the strain applied to the optical fiber P. Here, the strain with a minimum light intensity is linearly corresponds to a residual stress of the optical fiber P. It is noted that when a strain is additionally applied to the optical fiber, the residual stress is not removed, rather the strain is linearly superpositioned to the residual stress. Hence, a relation between the strain increased on the optical fiber P and the penetrability at a predetermined diameter spot exhibits a form of $\sin^2 \Phi$, wherein the $\Phi$ represents the phase difference of two polarized lights. FIG. 3 represents light intensity measured by the CCD Array 114 when there is no residual stress, but a strain is applied to the optical fiber P, where as FIG. 4 represents light intensity measured when there is a residual stress and strain is applied to the optical fiber P. The phase difference is sorted by a following equation 1.

$$\Phi(y) = W(y)F + \delta_0(y) \quad \text{[Equation 1]}$$

In the equation 1, $\delta_0(y)$ is a phase constant distribution of the light penetrated the optical fiber relative to the center of the optical fiber. F is a strain, and W(y) is a phase variation coefficient of the strain. Therefore, the residual stress of the optical fiber is obtained by measuring the phase constant and the photoelastic effect from the phase variation coefficient. Here, the residual stress and the photoelastic effect have a Abel integral transformation for the phase constant and the phase variation coefficient as shown in following second and third equations.

$$\sigma(r) = \frac{\lambda}{2\pi^2 C_1} \int_r^c \frac{\frac{d\delta(y)}{dy}}{\sqrt{y^2 - r^2}} dy, \quad \text{[Equation 2]}$$

$$C_1(r) = -\frac{E}{\pi} \int_r^c \frac{\frac{dW}{dy}}{\sqrt{y^2 - r^2}} dy \quad \text{[Equation 3]}$$

Here, $\sigma(r)$ is a residual stress, $C_1(r)$ is a photoelastic constant, E is a coefficient of zero, r is a radial coordinate of the optical fiber, c is outer diameter of the optical fiber, and y is a distance of the penetrated light from the center of the optical fiber.

The object lens 112 and a CCD camera make a magnified image of the optical fiber on the CCD array 114 to measure the penetrated light. The light intensity graph with respect to the applied strain (F) is obtained in this manner, as shown in FIGS. 3 and 4, can yield the corresponding W(y) (the phase variation coefficient of the strain) and $\delta_0(y)$ (the phase constant distribution of the light penetrated the optical fiber in a distance y from a center of the optical fiber). To this end, a computer 130 calculates the measured image in two dimension by synthesizing a travel of the motorized linear stage 120 and the strain value of the strain sensor 122, so as to have a three-dimensional light penetration graph like the equation 1 above. Thereafter, the residual stress and the photoelastic coefficient can be calculated by substituting these values in the equation 2 and the equation 3 above.

As described above, the method for measuring the residual stress in the related art is disclosed in several thesis papers but produces low-precision. Meanwhile, the apparatus of the present invention is expected to be more accurate and practical. The inventive apparatus is able to develop the optical fiber to have the low-loss and high-quality.

While the invention has been shown and described with reference to a certain preferred embodiment thereof, it will be understood by those skilled in the art that various changes in form and details may be made therein without departing from the spirit and the scope of the invention as defined by the appended claims.

What is claimed is:

1. A method for measuring a residual stress and photoelastic effect of an optical fiber, the method comprising the steps of:

measuring a strain with varying the strain over said optical fiber by a motorized linear stage and collecting a light penetrability variation data by a photoelastic effect; and calculating a exact phase variation coefficient W(y) and a phase constant $\delta o(y)$ for a given value y calculated by a following equation by using the collected light penetrability variation data in the form of $\sin^2\Phi$ and the measured strain;

$$\phi(y) = W(y)F + \delta_0(y)$$

wherein $\delta o(y)$ is a phase constant distribution of the light passed through said optical fiber relative to the center of said optical fiber, F is a strain, and W(y) is a phase variation coefficient of the strain.

2. The method of claim 1, further comprising the step of calculating a residual stress σ(r) and a photoelastic coeeficient constant $C_f(r)$ by an Abel integral transformation according to following second and third equations, respectively, with the phase variation coefficient constant W(y) and the phase constant δo(y);

$$\sigma(r) = \frac{\lambda}{2\pi^2 C_1} \int_r^c \frac{\frac{d\delta(y)}{dy}}{\sqrt{y^2 - r^2}} dy,$$

$$C_1(r) = -\frac{E}{\pi} \int_r^c \frac{\frac{dW}{dy}}{\sqrt{y^2 - r^2}} dy,$$

wherein σ(r) is a photoelastic constant, E is a coefficient of zero, r is a radius coordinate of the optical fiber, C is an outer diameter of the optical fiber, and y is a distance of the light passed through said optical fiber from the center of said optical fiber.

* * * * *